US011575436B1

(12) United States Patent
Seeger

(10) Patent No.: US 11,575,436 B1
(45) Date of Patent: Feb. 7, 2023

(54) SYSTEM FOR CORRECTING PHASE NOISE AND/OR DRIFT IN AN OPTICAL FIBER FOR A NETWORK ANALYZER

(71) Applicant: Rohde & Schwarz GmbH & Co. KG, Munich (DE)

(72) Inventor: Julius Seeger, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 17/580,340

(22) Filed: Jan. 20, 2022

(51) Int. Cl.
*H04B 10/2507* (2013.01)

(52) U.S. Cl.
CPC ................................ *H04B 10/2507* (2013.01)

(58) Field of Classification Search
None
See application file for complete search history.

(56) References Cited

U.S. PATENT DOCUMENTS

| | | | | |
|---|---|---|---|---|
| 7,589,843 | B2 * | 9/2009 | Aiyer | G01B 11/0675 356/485 |
| 9,019,019 | B2 | 4/2015 | Alouini et al. | |
| 11,333,688 | B2 * | 5/2022 | Yao | G01K 11/32 |

FOREIGN PATENT DOCUMENTS

| | | | | |
|---|---|---|---|---|
| CN | 112146853 A | * 12/2020 | | G01M 11/0271 |
| WO | 2021120485 A1 | 6/2021 | | |

OTHER PUBLICATIONS

Foreman, S.M. et al., “Remote transfer of ultrastable frequency references via fiber networks,” Rev. Sci. Instrum. 78, 022201 (2007); <https://doi.org/10.1063/1.2437069>.

* cited by examiner

*Primary Examiner* — Jai M Lee
(74) *Attorney, Agent, or Firm* — Christensen O’Connor Johnson Kindness PLLC

(57) ABSTRACT

A system for correcting phase noise and/or drift, the system includes an optical signal module being capable of amplitude modulating the optical signal while being phase- and/or frequency-shifted. Further, the system includes a beam splitter capable of separating at least backward travelling waves based on polarization. Moreover, a fiber connected to the beam splitter and a polarization rotator capable of changing the polarization of the optical signal are provided. The system has a partially reflecting reflector capable of creating a backward travelling wave as well as a photodiode capable of receiving the backward travelling wave. The photodiode is capable of generating a detection signal used for detecting phase noise and/or drift in the backward travelling wave.

20 Claims, 2 Drawing Sheets

SYSTEM FOR CORRECTING PHASE NOISE AND/OR DRIFT IN AN OPTICAL FIBER FOR A NETWORK ANALYZER

FIELD OF THE DISCLOSURE

Embodiments of the present disclosure relate generally to a system for correcting phase noise and/or drift introduced by an optical fiber.

BACKGROUND

In the state of the art, radio frequency over fiber ("RFoF") networks are known that are used to transmit data at high speed over large distances, as optical transmission of high-frequency (HF) signals is beneficial due to its very low loss per distance. Therefore, those networks are typically used when HF signals have to be transmitted between different buildings or even over distances of several hundred meters. In general, RFoF networks provide high bandwidth, low-loss communication links, while delivering the radio frequency signals at the optimal wavelength.

However, it has turned out that optical fibers are very sensitive to temperature and pressure, wherein both have an impact on the refractive index and therefore the propagation delay of the signals transmitted. This leads to an increased phase noise. Accordingly, radio frequency over fiber networks may have a phase noise pickup under certain circumstances, which is disadvantageous.

In the state of the art, it is known to overcome the above-mentioned issue by using frequency modulation (FM) schemes to deduce dispersion effects. However, this requires additional frequency sources and additional signal paths such that the overall system is more complicated. Consequently, the known solutions are cost-intensive.

Accordingly, there is a need for a cost-efficient and reliable possibility to obtain phase stabilization in a radio frequency over fiber network.

SUMMARY

Embodiments of the present disclosure provide a system for correcting phase noise and/or drift introduced by an optical fiber. In an embodiment, the systems comprise an optical signal module that is capable of amplitude-modulating an optical signal while being phase- and/or frequency-shifted, thereby outputting a modulated optical signal. The system further comprises a beam splitter connected to the optical signal module. The beam splitter is capable of separating at least backward travelling waves based on polarization. The system also comprises a fiber connected to the beam splitter. The system also comprises a polarization rotator capable of changing the polarization of the modulated optical signal. Further, the system comprises a partially reflecting reflector capable of creating a backward travelling wave. The partially reflecting reflector is located after the polarization rotator, for instance at the end of the fiber or after the fiber. In addition, the system comprises a photodiode capable of receiving the backward travelling wave created by the partially reflecting reflector. The photodiode is capable of generating a detection signal used for detecting phase noise and/or drift in the backward travelling wave.

Accordingly, the system is enabled to stabilize the phase of the modulated optical signal transmitted in an active manner by providing an additional feedback loop at source site. Hence, at receiver site, namely at the end of the fiber, the modulated optical signal is received with stabilized phase, namely the modulated optical signal provided by the optical signal module.

The modulated optical signal originating from the source site is at least partially, but preferably not fully reflected at receiver site, namely by the partially reflecting reflector, wherein the reflected optical signal travels back to the source site along the same fiber. As such, no parallel running fibers are used. This reflected optical signal corresponds to the backward travelling wave that is created by the partially reflecting reflector. Since the partially reflecting reflector is located after the polarization rotator, it is ensured that the modulated optical signal to be reflected by the partially reflecting reflector has passed the polarization rotator prior to being reflected. Consequently, the backward travelling wave passes the polarization rotator afterwards again.

The polarization rotator may be located before the fiber, at the beginning of the fiber, within the fiber, at the end of the fiber or after the fiber. Hence, the polarization rotator may be provided at the source site (before the fiber), for example at the interface to the fiber (at the beginning of the fiber). Further, the polarization rotator may also be provided at receiver site (after the fiber), for example at the interface to the fiber (at the beginning of the fiber). Moreover, the polarization rotator may be provided within the fiber, for instance between two separate segments of the fiber.

It is only important that the partially reflecting reflector is arranged on the receiver site so that a potential phase shift of the fiber is taken into consideration.

In general, the fiber along which the respective signals travel is configured to maintain a polarization of the signals travelling along the fiber. Hence, no change of the polarization of the respective optical signals is introduced by the fiber itself such that it can be ensured that both the modulated optical signal and the reflected optical signal each have a defined polarization.

The backward travelling wave arriving at the beam splitter corresponds to a signal that passed the polarization rotator twice, namely for the first time when the modulated optical signal, e.g. the forward travelling wave, travels towards the receiver site and for the second time when the optical signal reflected by the partially reflecting reflector, e.g. the backward travelling wave, travels back along the fiber towards the source site.

The signals processed by the beam splitter are indicative with regard their respective polarizations and therefore those signals can be distinguished from each other due to their respective polarizations. In some embodiments, the beam splitter is enabled to split only the backward travelling wave created by the partially reflecting reflector such that only this kind of backward travelling wave is forwarded to the photodiode for further processing. In some embodiments, this is ensured due to the polarization rotator of the system, which modifies the polarization in a defined manner.

In general, the beam splitter processes forward travelling waves as well as the backward travelling waves, for example the backward travelling waves created by partially reflecting reflector.

In addition, the beam splitter is also capable of distinguishing between backward travelling waves created at the source site, e.g. reflections at the interface between the source site and the fiber, and backward travelling waves created at the partially reflecting reflector, e.g. reflections at the partially reflecting reflector associated with the end of the fiber at receiver site. Thus, the beam splitter is enabled to distinguish between the different kinds of backward travelling waves that may occur, as the reflected signals at the beginning of the fiber may have never passed the polarization rotator and, therefore, the polarization of those signals is different to the polarization of the signals reflected at the partially reflecting reflector, as these signals have passed the polarization rotator twice. Accordingly, the beam splitter can distinguish between backward travelling waves originating from the receiver site, e.g. the ones reflected at the partially reflecting reflector, and those reflected at the source site (beginning of the fiber), e.g. at the interface of the source site to the fiber. Hence, the beam splitter is sensitive with regard to the polarization of the backward travelling waves so as to distinguish between their respective origins.

The beam splitter is further configured to only forward the backward travelling waves to the photodiode that have been created by partially reflecting reflector. As mentioned above, the respective signal associated with the backward travelling wave created by the partially reflecting reflector has traveled along the fiber twice and passed the polarization rotator twice. Any effects detected are doubled, as the respective backward travelling waves have passed the fiber twice.

Accordingly, an efficient system is provided for stabilizing the respective phase, as no additional frequency sources or rather signal paths are necessary. In some embodiments, the same fiber is used that forwards the signal from the source site to the receiver site for feeding the respective feedback loop provided at source site.

Generally, the setup of the system ensures to cancel all effects at the same time that have an influence on the phase of the signals processed by the optical fiber, namely temperature, pressure, bending, connectors and so on, as these conditions influence the refractive index.

Since the entire setup of the system is reduced with respect to the techniques known in the state of the art, the system may be at least partially chip-integrated, for example the feedback loop.

Further, the components associated with the receiver site, namely the polarization rotator, the partially reflecting reflector and a receiver, e.g. a photodiode, may also be chip-integrated.

As already indicated, phase stabilization at the receiver site is possible without any additional back-signaling. Therefore, the respective setup works also in rough environments where passive stabilization is insufficient.

Generally, the fiber, for example the optical fiber, located between the source site and the receiver site establishes a fiber link between both sites.

For instance, the polarization rotator may be established by a lambda/4 wave plate. Generally, a wave plate is an optical device that alters the polarization state of a light wave travelling through it, e.g. converting linearly polarized light into circularly polarized light and vice versa.

The respective conversion of the polarization in the entire system can be described as follows. A horizontally linear polarization is chanced to a circular polarization when the optical signal passes the polarization rotator, e.g. the lambda/4 rotator. Then, the optical signal is reflected by the partially reflecting reflector such that the polarization, e.g. the circular polarization is maintained. The reflected signal passes again the polarization rotator, e.g. the lambda/4 rotator, such that the circular polarization is changed to a vertically linear polarization.

Accordingly, the polarization (sensitive) beam splitter is enabled to distinguish between horizontally and vertically polarized waves so as to distinguish between the backward traveling waves reflected at source site and the ones reflected by the partially reflecting reflector at receiver site.

The partially reflecting reflector may be established by any surface non-coated or a reflective surface.

For instance, the optical signal module comprises an optical source providing an optical signal and an electro-optical modulator having an input connected with the optical source. The electro-optical modulator receives via its input the optical signal provided by the optical source. The electro-optical modulator is capable of amplitude modulating the optical signal while being phase- and/or frequency-shifted, thereby generating the modulated optical signal. Accordingly, a dedicated electro-optical modulator is provided that is separately formed with respect to the optical source, e.g. a laser, a laser diode or a light emitting diode. The optical source outputs an optical signal that is forwarded to the electro-optical modulator which in turn modulates the optical signal received in order to generate the modulated optical signal that is forwarded to the receiver site via the fiber.

Alternatively, the optical signal module is established by a (coherent) light source, e.g. a laser (diode), a light-emitting diode (LED), that is configured to modulate the optical signal directly in order to output the modulated optical signal. For instance, an operating current of the optical signal module, namely the (coherent) light source like the laser (diode), is altered, thereby generating the modulated optical signal. The operating current may be modulated by a local oscillator signal. This effectively results in the same modulation scheme as the one obtained due to the optical source and the electro-optical modulator which are separately formed.

An aspect provides that a single signal line is provided in some embodiments between the beam splitter and the partially reflecting reflector, wherein the single signal line is established by the fiber. Therefore, a very compact setup is provided by the system, which ensures that the feedback loop can be integrated on a single chip. In other words, no separate feedback line, for example a parallel line structure, is required, which in turn reduces the costs and the overall complexity of the system. Therefore, the system can be used in harsh environments effectively. However, this does not exclude that the fiber comprises more than one segment wherein the segments are connected in a serial manner to each other.

Another aspect provides that the optical signal module comprises in some embodiments a local oscillator port via which a local oscillator signal is received to set the modulation applied by the optical signal module, for instance the electro-optical modulator being part of the optical signal module. As mentioned above, phase and/or frequency may be adapted accordingly while amplitude-modulating the optical signal. The signal used for modulating may be received via the local oscillator port, namely a local oscillator signal.

The local oscillator signal may be provided by a local oscillator that may be part of the feedback loop. Alternatively, a direct digital synthesizer (DDS) may be used for providing the local oscillator signal.

For instance, a phase and/or frequency shifter is connected with the local oscillator port. Therefore, the respective local oscillator signal used by the optical signal module is pre-processed by the phase and/or frequency shifter that in turn may be controlled by a regulator/controller, thereby setting the phase and/or frequency of the local oscillator signal used for generating the modulated optical signal when being processed by the optical signal module, for example the electro-optical modulator.

As mentioned above, the local oscillator signal may be generated by the direct digital synthesizer (DDS) instead of using a dedicated phase shifter. The phase may be shifted within a digital feedback loop by setting a phase accumulator accordingly.

Generally, a phase-locked loop may be located between the optical signal module and the beam splitter. The phase-locked loop corresponds to the feedback loop that is located completely on source site. As mentioned above, the phase-locked loop may be chip-integrated such that a compact component of the entire system is ensured.

The phase-locked loop may be capable of controlling the optical signal module, e.g. the electro-optical modulator, to compensate for a phase noise and/or drift. Therefore, the phase may be stabilized appropriately, as the phase-locked loop controls the optical signal module, for example the electro-optical modulator of the optical signal module or the operating current of the (coherent) light source like the laser (diode), such that the phase is stabilized on receiver site. The respective controlling is ensured by the local oscillator signal that is adapted by the phase and/or frequency shifter or rather the direct digital synthesizer, for example the phase accumulator.

As mentioned before, the backward travelling wave introduced to the phase-locked loop has been travelled along the fiber twice. Therefore, the phase-locked loop works with twice the respective errors. This has to be taken into account in order to control the optical signal module appropriately to compensate for any effects causing phase noise and/or drift.

The phase noise and/or drift may be introduced by conditions to which the fiber is exposed, namely temperature, pressure, bending, connectors and similar influencing the refraction index.

According to a further aspect, the phase-locked loop comprises, for example, the photodiode. The photodiode may be located at the beginning of the phase-locked loop in order to receive the backward travelling wave separated by the beam splitter. The photodiode converts the optical signal received, namely the backward travelling wave, into an electrical signal processed further by the remaining components of the phase-locked loop, namely the detection signal.

Another aspect provides that the phase-locked loop comprises, for example, a local oscillator providing a local oscillator signal for the optical signal module, for example the electro-optical modulator. The local oscillator concerns the high-frequency part of the source site, wherein the local oscillator signal is used by the optical signal module, for example for performing the amplitude modulation so as to generate the modulated optical signal. In alternative to the local oscillator, the phase-locked loop may comprise a direct digital synthesizer.

In addition, the phase-locked loop may comprise a phase and/or frequency detector that receives the local oscillator signal and the detection signal. The phase and/or frequency detector is used to compare the local oscillator signal and the detection signal such that the phase and/or frequency detector is enabled to determine a difference in phase and/or frequency between both signals received, e.g. in the high frequency (HF) regime.

Furthermore, the phase-locked loop may comprise a controller having circuitry connected with the phase and/or frequency detector. In some embodiments, the controller is connected with an output of the phase and/or frequency detector such that the controller receives an output signal from the detector in case a difference between both signals processed has been identified, namely between the local oscillator signal and the detection signal.

The controller may be a proportional-integral-derivative (PID) controller.

The phase-locked loop may comprise a phase and/or frequency shifter, wherein the controller is capable of controlling the phase and/or frequency shifter. Thus, the phase and/or frequency of the local oscillator signal used for amplitude modulation by the optical signal module, for example the electro-optical modulator, is phase- and/or frequency-shifted by the phase and/or frequency shifter in response to a control signal received from the respective controller. The controller only issues the control signal based on the output signal received from the phase and/or frequency detector, namely when the detector has identified a difference between the original local oscillator signal and the detection signal associated with the backward travelling wave with regard to phase and/or frequency.

Alternatively, a phase shift of the control signal forwarded to the optical signal module is obtained via a shift in a phase accumulator of a direct digital synthesizer being part of the phase-locked loop. Hence, the dedicated phase and/or frequency shifter can be omitted.

For instance, the electro-optical modulator (of the optical signal module) is driven with a bias voltage to tune, preferably maximize, the nonlinearity of a transfer function to create harmonics, e.g. harmonics of the high frequency input from the local oscillator or rather the direct digital synthesizer. A bias controller may be provided for controlling the bias voltage. Hence, the tuning of the nonlinearity may result in substantially maximizing the nonlinearity of the transfer function.

As mentioned above, a phase-locked loop may be located between the electro-optical modulator and the beam splitter, wherein the phase-locked loop is configured to use an amplitude of the backward travelling wave to stabilize the bias voltage of the electro-optical modulator for harmonic mixing, and wherein the phase-locked loop is configured to use the phase of the backward travelling wave to correct the phase noise and/or drift. Accordingly, a simultaneous stabilizing of harmonics mixing and phase stabilization is achieved.

In some embodiments, the amplitude of the signal provided by the photodiode, namely the detection signal, can be used to stabilize the DC bias voltage to maintain the operating point of the electro-optical modulator, while the phase of the detector signal is used to stabilize the phase errors, namely phase noise and/or drift.

Moreover, a phase-locked loop may be located between the electro-optical modulator and the beam splitter, wherein a frequency of the modulated optical signal at receiver site differs from the frequency of the signal used by the phase-locked loop. Put differently, the operating frequency of the phase-locked loop can be different from the frequency of the modulated optical signal provided at the receiver site.

The local oscillator signal may be provided at a frequency f, whereas a receiver at receiver site may work at a frequency of 2xf, namely twice the frequency of the local oscillator. The phase-locked loop may also work at f. The phase stabilized optical signal at the receiver site can be 2xf, 4xf, 6xf, and so on.

Accordingly, the frequency of the modulated optical signal processed at the receiver site and the frequency of the signal processed by the feedback loop at the source site may be different.

The respective frequencies may be set either by bandpass filter(s), lowpass filter(s), highpass filter(s), frequency divider(s), frequency multiplier(s) and combinations thereof.

Generally, this is possible due to the intrinsic phase stability of the harmonics generated by the non-linear modulation.

A receiver may be located after the partially reflecting reflector, wherein the receiver is capable of decoding the optical signal. The receiver is used to process the information contained in the modulated optical signal transmitted over the fiber.

The partially reflecting reflector may be established on the receiver, e.g. as a surface coating of the receiver. For instance, a Faraday mirror may be at least partly realized on the surface of the receiver. Hence, the partially reflecting reflector and the receiver may be combined.

For instance, the receiver is established by a photodiode that converts the modulated optical signal received into an electrical signal for further processing.

In addition, at least one bandpass filter is provided. The bandpass filter may be located at receiver site, namely after the receiver capable of receiving and decoding the modulated optical signal travelled along the fiber. Alternatively or additionally, the bandpass filter is located between the photodiode and the phase and/or frequency detector, namely within the phase-locked loop. The bandpass filter may be tunable or fixed. Moreover, it may be a highpass filter bank or a lowpass filter bank.

Accordingly, the bandpass filter may be provided at receiver site and/or at source site.

The bandpass filter is enabled to only pass those harmonics that are wanted at receiver site. At source site, the bandpass filter is used as a filter for the phase-locked loop.

If lower frequencies at the phase-locked loop are wanted, a low frequency photodiode is used at the phase-locked loop.

In addition, the optical signal module, for example the electro-optical modulator, may have a limited input frequency from the local oscillator. Hence, lower frequencies may be used for the phase-locked loop.

Alternatively, frequency multipliers and/or frequency dividers can be used so as to adapt the frequency of the signal used for processing.

The partially reflecting reflector and the polarization rotator may be combined. In a specific embodiment, the polarization rotator and the partially reflecting reflector are established by a single device, e.g. a Faraday mirror, namely an arrangement of a Faraday rotator with a mirror located after the Faraday rotator.

As mentioned above, a Faraday mirror may be used for rotating the polarization in the defined manner and reflecting the optical signal at least partially. Hence, both functions, namely polarization rotation and partial reflection) are provided by the Faraday mirror.

The partially reflecting reflector may be established by a partially reflective surface. Thus, a cost-efficient partially reflecting reflector can be established.

The optical source may be a (coherent) light source, e.g. laser (diode) or a light emitting diode (LED), that provides the optical signal to be processed.

Further, the electro-optical modulator may be a Mach-Zehnder modulator (MZM).

Generally, the system can be used for distribution of the local oscillator signal in the GHz regime with almost no transmission loss due to the optical fiber used for transmitting the (modulated) optical signal that has been modulated based on the local oscillator signal received from the local oscillator or rather the direct digital synthesizer.

In some embodiments, the system described above may be used in a network analyzer.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
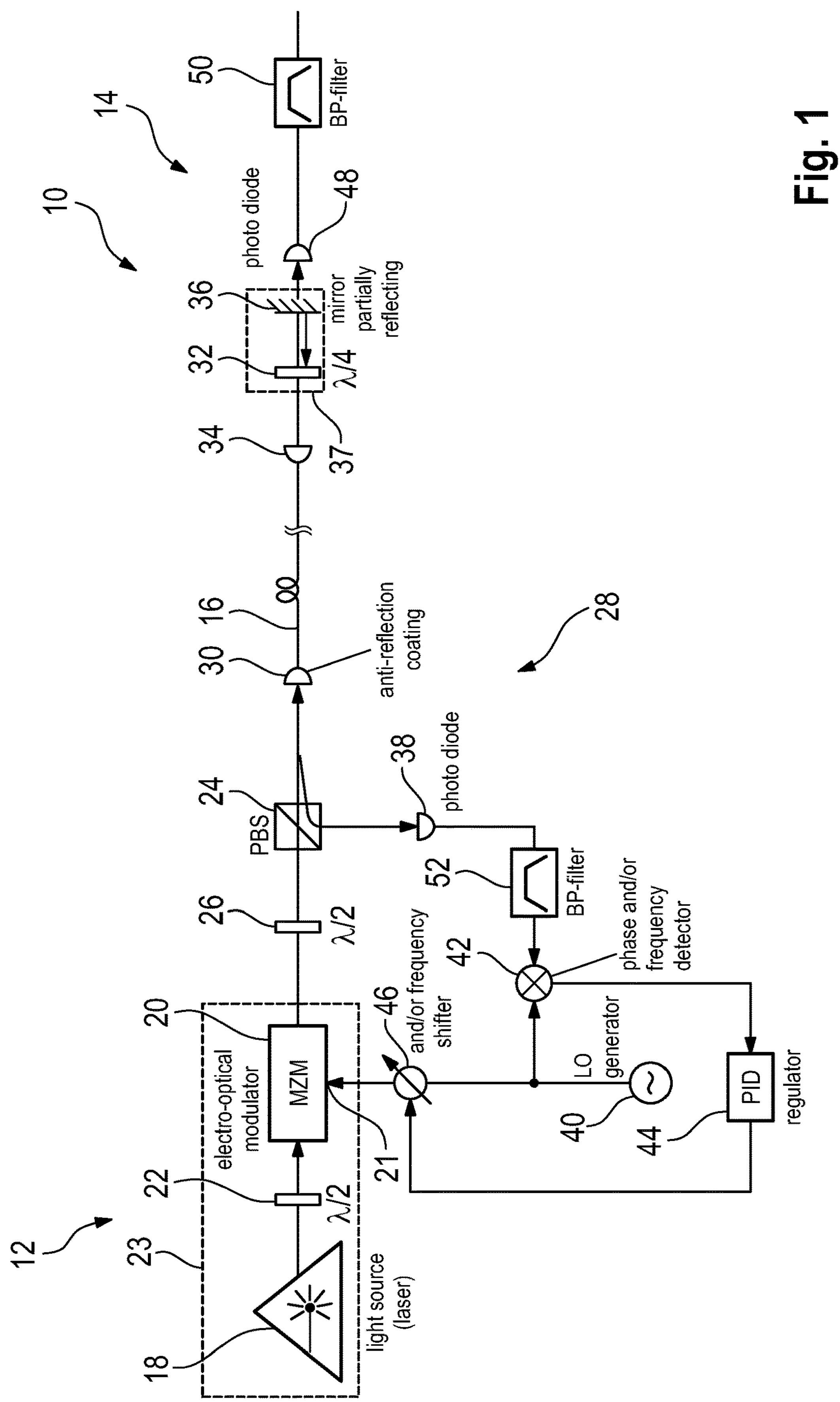
FIG. 1 schematically shows an overview of a system for correcting phase noise and/or drift according to a first embodiment, and FIG. 2 schematically shows a system for correcting phase noise and/or drift according to a second embodiment.

In FIG. 1, a system 10 is shown that is used for correcting phase noise and/or drift. As shown in FIG. 1, the system 10 comprises a source site 12 as well as a receiver site 14, wherein a fiber 16, namely an optical fiber, is located between both sites, namely the source site 12 and the receiver site 14. The fiber 16 can be made of a single piece or of a plurality of pieces connected to each other in a serial manner. The plurality of pieces of the fiber 16 could be spliced together or connected to each other by connectors. In certain embodiments, the system 10 is free of parallel running fibers 16 connecting the source site 12 to the receiver site 14 and vice versa.

On source site 12, an optical source 18 is provided that is established by a laser in the shown embodiment. The optical source 18 provides an optical signal that is forwarded to an electro-optical modulator 20 that has a local oscillator port 21 for receiving a local oscillator signal used for modulating purposes.

The electro-optical modulator 20 may be established by a Mach-Zehnder modulator (MZM). In some embodiments, the electro-optical modulator 20 may be driven with a bias voltage to maximize the nonlinearity of a transfer function as to create harmonics.

Further, a polarization control 22 is located between the optical source 18 and the electro-optical modulator 20, thereby ensuring that the electro-optical modulator 20 receives an optical signal having a defined polarization. For instance, the polarization control 22 may be established by a wave plate, for instance a lambda/2 wave plate.

Accordingly, the optical source 18 and the electro-optical modulator 20 together establish an optical signal module 23 that is capable of amplitude modulating the optical signal while being phase- and/or frequency-shifted, thereby outputting the modulated optical signal.

The system 10 further comprises a beam splitter 24 that is also located on the source site 12. The beam splitter 24 is a polarization beam splitter (PBS). In the embodiment shown, the beam splitter 24 is connected to the optical signal module 23, for example the electro-optical modulator 20, so as to receive the amplitude-modulated optical signal that is outputted by the optical signal module 23, for example the electro-optical modulator 20.

In the shown embodiment, another polarization control 26 is located between the optical signal module 23, for example the electro-optical modulator 20, and the beam splitter 24, which may be used to ensure that no polarization effects introduced by the optical signal module 23, for example the electro-optical modulator 20, have an impact on the further processing. Alternatively, only one of both polarization controls 22, 26 or even none of the polarization controls 22, 26 is provided.

The beam splitter 24 is generally capable of separating forward travelling waves, namely waves travelling in the first direction, and backward travelling waves, namely waves travelling in the opposite direction, based on polarization. Accordingly, the beam splitter 24 separates backward travelling waves based on their respective polarization such that only those backward travelling waves are split off for further processing that have a certain polarization. This will be explained later in more detail.

In addition, the system 10 comprises on the source site 12 a feedback loop 28 that is also connected to the beam splitter 24 in order to receive the respective signal split by the beam splitter 24, namely the backward travelling waves having the certain polarization. The feedback loop 28 is established in some embodiments as a phase-locked loop as will be described later.

The beam splitter 24 is also connected with the fiber 16 via an interface 30 that may have an anti-reflection coating. The fiber 16 generally maintains the respective polarization of the optical signal that travels along the fiber 16 from the source site 12 to the receiver site 14.

The respective optical signal travelling along the fiber 16 from the source site 12 to the receiver site 14 passes a polarization rotator 32 that may be established by a wave plate, for instance a lambda/4 wave plate. Hence, the polarization of the optical signal passing the polarization rotator 32 is changed in a defined manner. In other words, the polarization rotator 32 is capable of changing the polarization of the optical signal that passes the polarization rotator 32. For example, if the (modulated) optical signal has a linear polarization of 0° before the polarization rotator 32, the (modulated) optical signal is circular polarized after a single pass of the polarization rotator 32.

Figure 2:
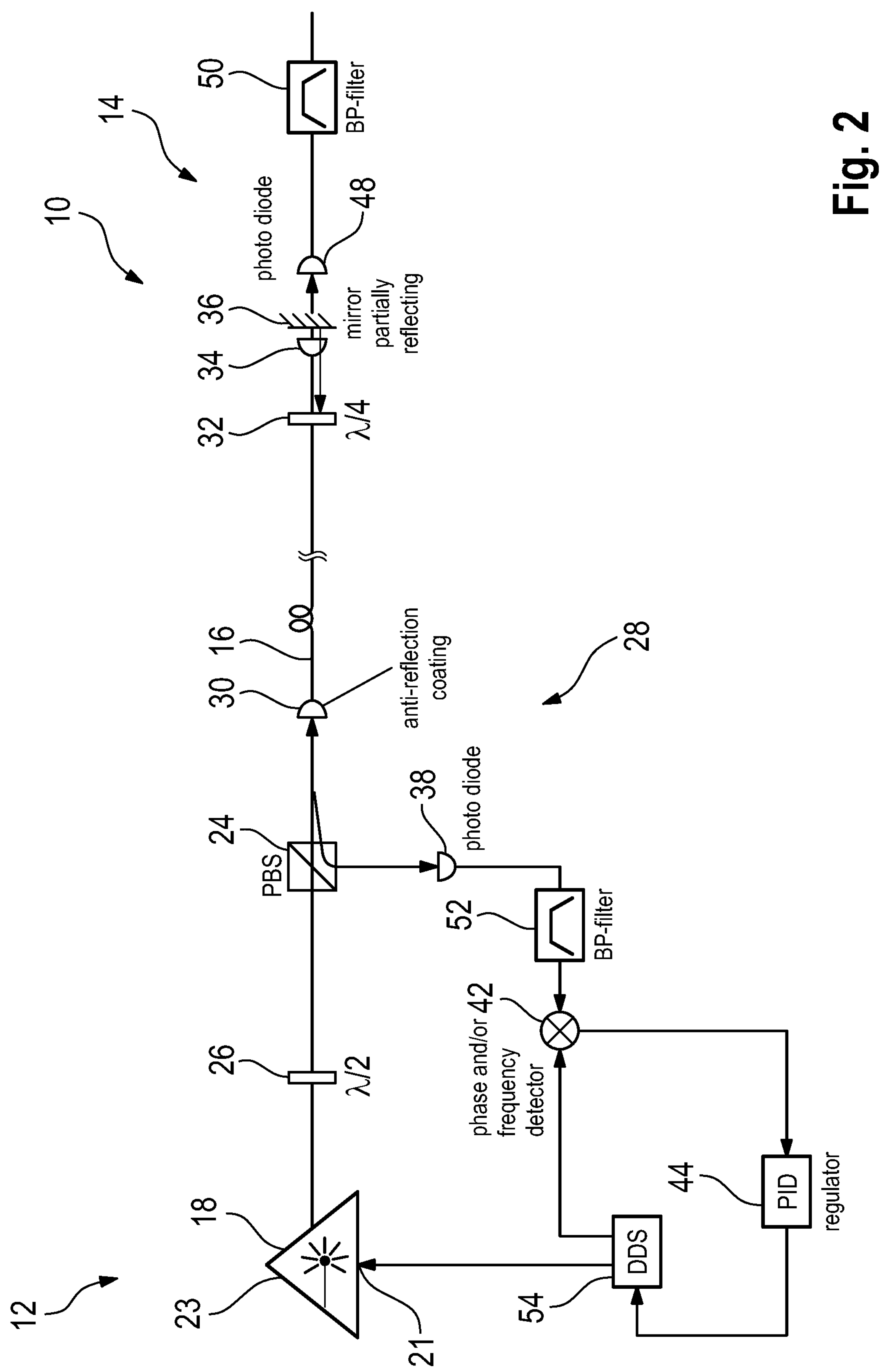

In the embodiment shown in FIG. 1, the polarization rotator 32 is located after the fiber 16, namely after an interface 34 between the fiber 16 and receiver site 14. However, the polarization rotator 32 may also be located directly at the end of the fiber 16, namely as part of the interface 34, or within the fiber 16 as shown in FIG. 2, e.g. in front of the interface 34.

In general, the polarization rotator 32 could also be arranged before the fiber 16 at the beginning of the fiber 16, namely the interface 30. In that case, the polarization rotator 32 would be arranged at the source site 12.

In certain embodiments, there is only one polarization rotator 32 which is either arranged at the source site 12 or at the receiver site 14.

The system 10 may also comprise a partially reflecting reflector 36 that may be established by a partially reflecting surface. For instance, the partially reflecting reflector 36 may be a mirror that partially reflects the optical signal impinging thereon. In certain embodiments, there is only one partially reflecting reflector 36 which is arranged at the receiver site 14.

The polarization rotator 32 and the partially reflecting reflector 36 may be separately formed components or alternatively established by a single device 37 as indicated by the box with dashed-lines. For instance, the single device 37 may be a Faraday mirror, e.g. an arrangement of a Faraday rotator with a mirror located after the Faraday rotator. The single device 37 is then arranged at the receiver site 14.

Therefore, the partially reflecting reflector 36 creates a backward travelling wave that travels from the receiver site 14 towards the source site 12. In the embodiment shown in FIG. 1, the partially reflecting reflector 36 is located after the fiber 16. However, the partially reflecting reflector 36 can also be located at the end of the fiber 16 as shown in the embodiment of FIG. 2, namely as part of the interface 36. In any case, the partially reflecting reflector 36 is located after the polarization rotator 32 in terms of the travelling direction of the optical signal originating from the light source 18.

The backward travelling wave created by the partially reflecting reflector 36 travels along the fiber 16 from the receiver site 14 towards the source site 12 as mentioned above, thereby passing again the polarization rotator 32 such that the polarization of the reflected optical signal, namely the backward travelling wave, is manipulated again in a defined manner.

In case that the polarization rotator 32 is a lambda/4 wave plate, passing the wave plate once forward and once backwards (so all in all a "double pass") gives a phase shift of 90°. Accordingly, if the incoming light is linear polarized in a vertical direction the backwards travelling wave after the "double pass" is polarized linearly in a horizontal direction. Then, the backward travelling wave has the certain polarization that is used by the beam splitter 24.

The backward travelling wave travels along the (same) fiber 16 towards the beam splitter 24 that processes the backward travelling wave accordingly. As mentioned above, the backward travelling wave that reaches the beam splitter 24 has passed the polarization rotator 32 twice and travelled along the fiber 16 twice.

The polarization of the backward travelling wave has a defined polarization that matches with the one of the beam splitter 24 used for splitting. Hence, the beam splitter 24 is enabled to separate the backward travelling wave created by the partially reflecting reflector 36.

Put differently, the beam splitter 24 is enabled to distinguish between a backward travelling wave created by the partially reflecting reflector 36 and a backward travelling wave reflected at the source site 12, for instance at the interface 30, namely at the beginning of the fiber 16, due to the respective polarizations of these backward travelling waves, as only the backward travelling wave reflected at the partially reflecting reflector 36 has passed the polarization rotator 32 twice, thereby having the dedicated polarization that matches with the one used by the beam splitter 24 for splitting.

The beam splitter 24 splits the respective backward travelling wave received from the partially reflecting reflector 36 such that it is inputted into the feedback loop 28. The feedback loop 28, namely the phase-locked loop, may comprise a photodiode 38 at its beginning. Hence, the photodiode 38 receives the backward travelling wave, namely the corresponding optical signal, and converts the respective optical signal into an electrical signal for further processing. Thus, the photodiode 38 generates a detection signal that is further processed by the feedback loop 28.

In the shown embodiment, the feedback loop 28 also comprises a local oscillator 40 that generally provides a local oscillator signal used by the optical signal module 23, for example the electro-optical modulator 20, for amplitude modulation of the optical signal, e.g. the one provided by the optical source 18.

Further, the phase-locked loop 28 may have a phase and/or frequency detector 42 that receives both the detection signal of the photodiode 38 and the local oscillator signal provided by the local oscillator 40. The phase and/or frequency detector 42 is enabled to identify a deviation of the signals processed by comparing both signals, for example their characteristics such as phase and/or frequency.

In case the phase and/or frequency detector 42 has identified a deviation of both signals with regard to phase and/or frequency, the phase and/or frequency detector 42 outputs an output signal to a controller 44, for instance a PID controller. The controller 44 in turn controls a phase and/or frequency shifter 46 based on the output signal received. In some embodiments, the controller 44 includes one or circuits.

The phase and/or frequency shifter 46 processes the local oscillator signal provided by the local oscillator 40 prior to feeding the respective local oscillator signal into the electro-optical modulator 20, e.g. the local oscillator port 21.

Hence, the controller 44 is enabled to set the phase and/or frequency shifter 46 such that the signal provided at the fiber end, e.g. at receiver site 14, has a phase and/or frequency that matches with the local oscillator signal provided by the local oscillator 40 at source site 12. Therefore, an active phase stabilization is ensured by the feedback loop 28 fully implemented on source site 12.

On receiver site 14 the system 10 may further comprise a receiver 48 that is established, for example, by a photodiode. The receiver 48 decodes the optical signal received at the receiver site 14 so as to obtain the data transmitted, e.g. the local oscillator signal.

In addition, the system 10 may comprises a (bandpass) filter 50 that may be provided at receiver site 14, namely after the receiver 48, such that only those frequency portions, e.g. harmonics being of interest are further processed on the receiver site 14. Furthermore, a (bandpass) filter 52 may also be located on source site 12, namely as part of the feedback loop 28, wherein the (bandpass) filter 52 is used for filtering the signals inputted into the feedback loop 28. The (bandpass) filter 52 is preferably arranged after the photodiode 38.

Generally, the frequency of the modulated optical signal processed at the receiver site 14 and the frequency of the signal processed by the feedback loop 28 at the source site 12 may be different. The respective frequencies may be set either by the bandpass filter(s), lowpass filter(s), highpass filter(s), frequency divider(s), frequency multiplier(s) and combinations thereof.

In general, the system 10 uses a back reflection from the receiver site 14 to maintain phase stabilization. The respective system 10 uses different polarization modes of the electromagnetic waves in order to distinguish between the waves, thereby increasing directivity in the beam splitter 24. The beam splitter 24 may be established by a directional element, for instance a directional coupler.

In FIG. 2, an alternative embodiment is shown. In the respective embodiment, the local oscillator 40 and the phase and/or frequency shifter 46 are replaced by a direct digital synthesizer (DDS) 54 that is controlled by the controller 44 so as to provide the local oscillator signal fed to the optical signal module 23. Additionally, the DDS 54 also provides the local oscillator signal for the phase and/or frequency detector 42.

The DDS 54 may comprise a phase accumulator that is set by the controller 44 so as shift the phase of the local oscillator signal provided in a defined manner. The DDS 54 in certain embodiments comprises two outputs. One output is connected to the optical signal module 23 and the other output is connected to the phase and/or frequency detector 42. As such, the signal present at both outputs are decoupled from each other.

Moreover, the optical signal module 23 may be provided by a single (coherent) light source 18, e.g. a single laser (diode). The operating current of the optical signal module 23 is controlled in order to perform the amplitude modulation accordingly. Hence, a direct modulation is enabled.

Certain embodiments disclosed herein include one or more components that utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, filter information, etc. Circuitry of any type can be used. It will be appreciated that the term “information” can be use synonymously with the term “signals” in this paragraph. It will be further appreciated that the terms “circuitry,” “circuit,” “one or more circuits,” etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term “plurality” to reference a quantity or number. In this regard, the term “plurality” is meant to be any number that is more than one, for example, two, three, four, five, etc. The terms “about,” “approximately,” “near,”

etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for correcting phase noise and/or drift, the system comprising:

- an optical signal module being capable of amplitude modulating an optical signal while being phase- and/or frequency-shifted, thereby outputting a modulated optical signal,
- a beam splitter connected to the optical signal module, the beam splitter being capable of separating at least backward travelling waves based on polarization,
- a fiber connected to the beam splitter,
- a polarization rotator capable of changing the polarization of the modulated optical signal,
- a partially reflecting reflector capable of creating a backward travelling wave, the partially reflecting reflector being located after the polarization rotator, and
- a photodiode capable of receiving the backward travelling wave created by the partially reflecting reflector, the photodiode being capable of generating a detection signal used for detecting phase noise and/or drift in the backward travelling wave.

2. The system according to claim 1, wherein the optical signal module comprises an optical source providing an optical signal and an electro-optical modulator having an input connected with the optical source, wherein the electro-optical modulator receives via its input the optical signal provided by the optical source, and wherein the electro-optical modulator is capable of amplitude modulating the optical signal while being phase- and/or frequency-shifted, thereby generating the modulated optical signal.

3. The system according to claim 2, wherein the electro-optical modulator is driven with a bias voltage to tune the nonlinearity of a transfer function to create harmonics.

4. The system according to claim 3, wherein a phase-locked loop is located between the electro-optical modulator and the beam splitter, and wherein the phase-locked loop is configured to use an amplitude of the backward travelling wave to stabilize the bias voltage of the electro-optical modulator for harmonic mixing, and wherein the phase-locked loop is configured to use the phase of the backward travelling wave to correct the phase noise and/or drift.

5. The system according to claim 3, wherein a phase-locked loop is located between the electro-optical modulator and the beam splitter, and wherein a frequency of the modulated optical signal at receiver site differs from the frequency of the signal used by the phase-locked loop.

6. The system according to claim 1, wherein a single signal line is provided between the beam splitter and the partially reflecting reflector, and wherein the single signal line is established by the fiber.

7. The system according to claim 1, wherein the optical signal module comprises a local oscillator port via which a local oscillator signal is received to set the modulation applied by the optical signal module.

8. The system according to claim 7, wherein a phase and/or frequency shifter is connected with the local oscillator port.

9. The system according to claim 1, wherein a phase-locked loop is located between the optical signal module and the beam splitter.

10. The system according to claim 9, wherein the phase-locked loop is capable of controlling the optical signal module to compensate for a phase noise and/or drift.

11. The system according to claim 9, wherein the phase-locked loop comprises the photodiode.

12. The system according to claim 9, wherein the phase-locked loop comprises a local oscillator providing a local oscillator signal for the optical signal module.

13. The system according to claim 9, wherein the phase-locked loop comprises a phase and/or frequency detector that receives the local oscillator signal and the detection signal.

14. The system according to claim 13, wherein the phase-locked loop comprises a controller connected with the phase and/or frequency detector.

15. The system according to claim 14, wherein the controller is a proportional-integral-derivative controller.

16. The system according to claim 15, wherein the phase-locked loop comprises a phase and/or frequency shifter, the controller being capable of controlling the phase and/or frequency shifter.

17. The system according to claim 9, wherein a phase shift of the control signal forwarded to the optical signal module is obtained via a shift in a phase accumulator of a direct digital synthesizer being part of the phase-locked loop.

18. The system according to claim 1, wherein a receiver is located after the partially reflecting reflector, the receiver being capable of decoding the optical signal.

19. The system according to claim 1, wherein at least one bandpass filter is provided.

20. The system according to claim 1, wherein the partially reflecting reflector and the polarization rotator are combined.

* * * * *